US008990583B1

(12) United States Patent
McEachron

(10) Patent No.: US 8,990,583 B1
(45) Date of Patent: Mar. 24, 2015

(54) FORENSIC INVESTIGATION TOOL

(75) Inventor: Jon Daniel McEachron, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1543 days.

(21) Appl. No.: 11/858,801

(22) Filed: Sep. 20, 2007

(51) Int. Cl.
G06F 21/00 (2013.01)
G06F 12/14 (2006.01)
G06F 21/12 (2013.01)

(52) U.S. Cl.
CPC .................................. *G06F 21/123* (2013.01)
USPC ........................................ 713/193; 380/227

(58) Field of Classification Search
USPC ......... 714/758; 380/28, 278; 707/103; 726/3; 709/231; 713/193
See application file for complete search history.

(56) References Cited

U.S. PATENT DOCUMENTS

| | | | | |
|---|---|---|---|---|
| 6,004,028 | A * | 12/1999 | Bottomley | 714/758 |
| 2001/0044901 | A1* | 11/2001 | Grawrock | 713/189 |
| 2006/0014521 | A1* | 1/2006 | Chen et al. | 455/410 |
| 2007/0110227 | A1* | 5/2007 | Yokouchi | 380/28 |
| 2007/0143339 | A1* | 6/2007 | Springett | 707/103 R |
| 2008/0098237 | A1* | 4/2008 | Dung et al. | 713/189 |
| 2008/0123854 | A1* | 5/2008 | Peel et al. | 380/277 |
| 2008/0184338 | A2* | 7/2008 | McCreight et al. | 726/3 |
| 2008/0297599 | A1* | 12/2008 | Donovan et al. | 348/143 |
| 2008/0298592 | A1* | 12/2008 | Khalid et al. | 380/278 |
| 2009/0177793 | A1* | 7/2009 | Josa et al. | 709/231 |

OTHER PUBLICATIONS

Bruce Schneier; Secure audit logs to support computer forensics; Year of Publication: 1999 ; ASM; oo: 1-18.*
Casey, E. and Stanley, A. "Tool review—remote forensic preservation and examination tools." Digital Investigation, 2004, p. 284-297, [retrieved from the Internet on Jan. 31, 2008 using <URL: http://www.strozllc.com/files/Publication/e6af3502-59fb-4600-80b7-06e5ea94c632/Presentation/PublicationAttachment/9c39df88-e5a6-416e-b672-0be228db7cfc/EC_Tool%20Review.pdf>].
Craiger, J., Pollitt, M. and Swauger, J. "Law Enforcement and Digital Evidence." To appear in Handbook of Information Security, New York, Apr. 1, 2005, p. 1-42, [retrieved from the Internet on Jan. 31, 2008 using <URL: http://www.ncfs.org/craiger.delf.revision.pdf>].

(Continued)

*Primary Examiner* — Shewaye Gelagay
*Assistant Examiner* — Monjour Rahim
(74) *Attorney, Agent, or Firm* — Fish & Richardson P.C.

(57) ABSTRACT

Methods and systems are disclosed a digital investigation tool capable of recovering and decrypting content. The tool combines digital techniques with decryption capability for a wide range of encryption algorithms. In one implementation, the tool identifies the type and/or vendor of the encryption algorithm used to protect the content. The tool then automatically obtains the decryption information needed to decrypt the content. Depending on the encryption algorithm used, the information may include a master key, user-specific keys, user IDs, passwords, and the like. The decryption information may be accumulated in a local or remote storage location accessible by the tool, or it may be acquired in real time on an as-needed basis from a third-party encryption vendor, a key server, and the like. Such an arrangement allows law enforcement agencies as well as corporate security personnel to quickly recover and decrypt content stored on a computer system.

19 Claims, 6 Drawing Sheets

(56) References Cited

OTHER PUBLICATIONS

Postnote. "Data Encryption." Parliamentary Office of Science and Technology, United Kingdom, Oct. 2006, No. 270, [retrieved from the Internet on Jan. 31, 2008 using <URL: http://www.parliament.uk/documents/upload/postpn270.pdf>].

Casey, E. "Practical Approaches to Recovering Encrypted Digital Evidence." International Journal of Digital Evidence, Fall 2002, vol. 1, Issue 3, p. 1-26, [retrieved from the Internet on Jan. 31, 2008 using <URL: http://www.utica.edu/academic/institutes/ecii/publications/articles/A04AF2FB-BD97-C28C-7F9F4349043FD3A9.pdf>].

* cited by examiner

FORENSIC INVESTIGATION TOOL

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to digital forensic investigation tools and, more specifically, to systems and methods for implementing a digital forensic investigation tool that is capable of searching and examining encrypted content.

BACKGROUND

Digital forensic generally refers to techniques for inspecting a computer system in order to recover data, text, images, video, audio, and other content stored on the system. It is most commonly performed in the context of a civil or criminal proceeding to obtain or preserve evidence, but has also been used in corporate environments to enforce company policies concerning the use of computers by employees and the like. These digital forensic techniques rely on highly specialized software and hardware tools that can quickly search through hard drives, network storage areas, USB keychain drives or so-called "thumb drives," CDs, DVDs, solid state drives, memory cards, and other storage media to which an employee may have access.

Operation of digital forensic investigation tools is well known to those having ordinary skill in the art and will thus be mentioned only briefly here. Generally speaking, the tool has two main operational phases, though each phase is susceptible of one or more constituent stages. First, the tool extracts the data stored on the storage medium. This phase is arguably the easier of the two phases in that it requires the tool to simply read the raw bits (i.e., 1's and 0's) on the storage medium. The second and considerably more difficult phase involves analyzing and assigning meaning to the bits so that they may be searched for information. This phase requires the tool to organize or group the bits into logical patterns from which information may be interpreted. For this phase, the tool or its user must typically have or be able to obtain certain items of information about the storage medium, such as media type, file system, data structure, and the like.

Despite their technical sophistication, current digital forensic investigation tools fare little better than common administrative tools against a file or storage medium that is encrypted. Due to the strength of modern encryption algorithms, present digital forensic investigation tools have no practical way to search or examine the content of an encrypted file or storage medium. Compounding the problem, a growing concern about unauthorized access to their data has resulted in more companies requiring files and storage media be encrypted. This encryption has encompassed not only highly sensitive or mission critical data, but also routine day-to-day operational data. Thus, the inability of current digital forensic investigation tools to examine or search encrypted content may present a significant problem for investigative personnel going forward.

Accordingly, what is needed is a more effective digital forensic investigation tool. More specifically, what is needed is a way for digital forensic investigation tools to be able to search and examine content that has been encrypted.

SUMMARY

The disclosed embodiments are directed to a digital investigation tool that is capable of searching and examining encrypted content. The tool combines digital investigation techniques with decryption capability for a wide range of encryption algorithms. In one implementation, the digital investigation tool may be configured to identify the type and/or vendor of the encryption algorithm used to protect the content. The digital investigation tool may then be configured to automatically obtain the decryption information needed to decrypt the content. Depending on the encryption algorithm used, the decryption information may include a master key, user-specific keys, user IDs, passwords, and the like. This decryption information may be accumulated in a local or remote storage location accessible by the digital investigation tool, or it may be acquired in real time on an as-needed basis from a third-party vendor, a key server, and the like. Such an arrangement allows law enforcement agencies as well as corporate security personnel to quickly recover and decrypt content stored on a computer system.

BRIEF DESCRIPTION OF THE DRAWINGS

The foregoing and other advantages of the invention will become apparent from the following detailed description and upon reference to the drawings, wherein.

DETAILED DESCRIPTION

Figure 1:
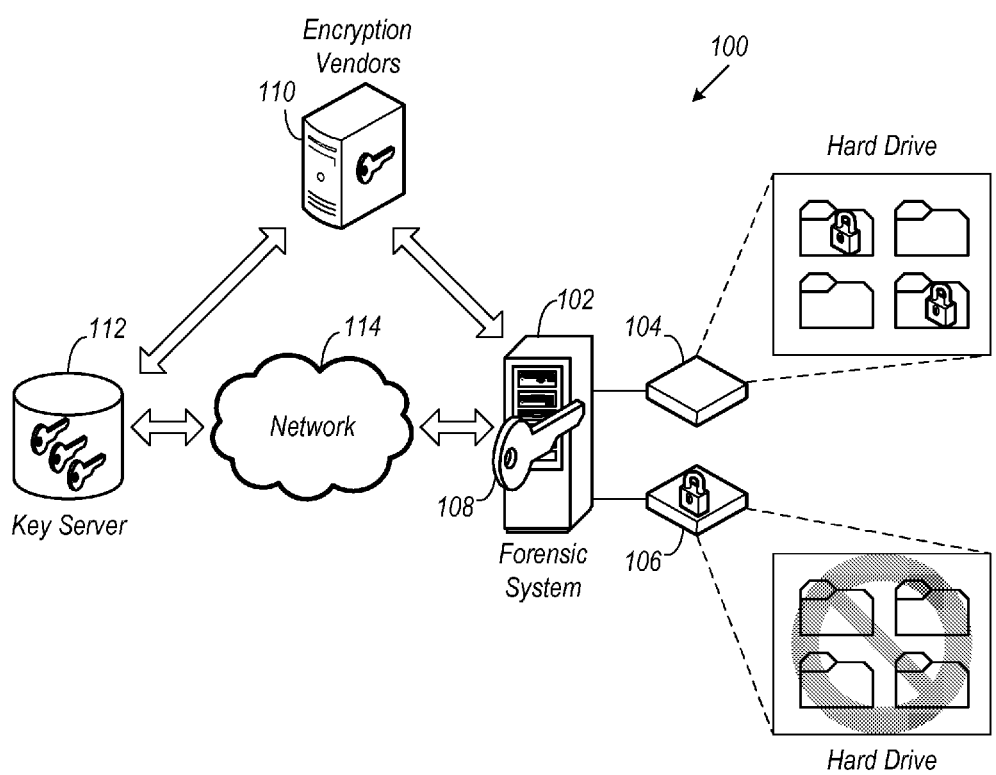
FIG. 1 illustrates an exemplary infrastructure for a digital forensic investigation tool according to the disclosed embodiments.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

As alluded to above, corporate concerns about data being stolen or otherwise falling into the hands of unauthorized parties have prompted policies requiring files and storage media be encrypted. Such encryption can significantly hamper the ability of law enforcement agencies and/or corporate security personnel to gather evidence from storage media. The reason is because current digital forensic investigation tools, while typically able to read the raw bits that make up the encrypted content, are unable to interpret or search the encrypted content. The disclosed embodiments provide systems and methods for implementing a digital forensic investigation tool that is also capable of decrypting the encrypted content.

The term "encryption" is used herein to refer to the partial or complete transformation of content, including data, text, images, video, audio, and the like, so as to render the content unusable to all except those possessing special decryption information. The transformation may or may not result in compression of the content, depending on whether the encryption algorithm used is also a compression algorithm. This is in contrast to access restriction, which is employed by most computer operating systems to prevent a user from logging on to another user's account. Access restriction typically does not transform the content on a computer and is therefore readily overcome by modern digital forensic investigation tools. Encryption, on the other hand, protects the content on the computer even when the computer (hence, the operating system) is not turned on. The term "encryption" as used herein also encompasses copy protection technologies, such as Digital Rights Management (DRM) technology, frequently used on certain types of copyrighted content. Depending on the particular technology, the copy protection may partially or completely encrypt the content or it may simply restrict access to the content, or both.

Referring now to FIG. 1, an exemplary infrastructure 100 is shown for providing a digital forensic investigation tool according to the disclosed embodiments. Although the disclosed embodiments are described with respect to a digital forensic investigation tool, those having ordinary skill in the art will recognize the concepts and teachings herein may be applied to any digital investigation involving data searching, finding, reporting, aging, retention/deletion, and the like. In general, any application where decryption information may be automatically provided to an investigation tool in order to decrypt content is within the scope of the disclosed embodiments.

As can be seen, exemplary infrastructure 100 includes, among other things, a forensic system 102 that is capable of recovering content from a storage medium as well as decrypting such content. In general, the forensic system 102 may be used to recover, decrypt, and search content from any storage media, including hard drives, network storage areas, USB keychain drives, CDs, DVDs, solid state drives, memory cards. These storage media may be found in numerous types of devices, including computers, cell phones, personal digital assistants (PDA), handhelds electronic messaging devices, (e.g., Blackberries, pagers), iPod, iPhones, MP3 players, RFID tags, video players/recorders, answering machines, and the like, all of which may have content that can be recovered, decrypted, and searched using the forensic system 102.

In the example shown here, the forensic system 102 may be used to recover, decrypt, and search content from a hard drive 104 (or an image thereof) where encryption is performed only on certain files or folders/directories, indicated by the padlock symbol. In another example, the forensic system 102 may also be used to recover, decrypt, and search content from a hard drive 106 (or an image thereof) where all content stored to the drive is encrypted without regard to individual files or folders/directories.

Examples of encryption algorithms that may be used include Data Encryption Standard (DES), Advanced Encryption Standard (AES), RSA, Blowfish, and the like. These algorithms may be found in a wide range of third-party encryption applications, such as Pretty Good Privacy (PGP) from PGP Corporation of Palo Alto, Calif.; SafeBoot Technology N.V. Ltd. of Naples, Fla.; and SecureDisc from Global Technologies Group, Inc. of Arlington, Va. Other examples of third-party encryption applications may include Pointsec PC from Check Point Software Technologies, Ltd. of Redwood City, Calif.; SafeGuard Easy from Utimaco Safeware, Inc. of Foxboro, Mass., and the like. The particular encryption algorithm used, however, is not overly important to the practice of the disclosed embodiments, as the concepts and teachings imparted herein are applicable to many types of encryption algorithms. These applications may be configured to perform the encryption automatically or "on-the-fly" so that it is substantially transparent to the user, or they may allow the user to manually encrypt specific files, folders/directories, and the like. Of course, it is also possible for a corporate security department to develop and deploy its own encryption applications instead of using third-party applications without departing from the scope of the disclosed embodiments.

In accordance with the disclosed embodiments, the forensic system 102 may automatically identify the type and/or vendor of the encryption algorithm used to encrypt the content. The forensic system 102 may then automatically acquire decryption information needed for that encryption algorithm to decrypt the content. The term "automatically" is used herein to mean little or no user interaction is required, but does not exclude the possibility of the user manually intervening if he/she deems it to be necessary. The decryption information may be acquired in real time on an as-needed basis from third-party encryption vendors 110, a key server 112, and the like. Such acquisition may be accomplished directly through the vendors 110 over a private and secure channel 114, or it may be accomplished over a public network 116, such as the Internet, using an appropriate security protocol (e.g., IPSec, etc.).

Figure 2:
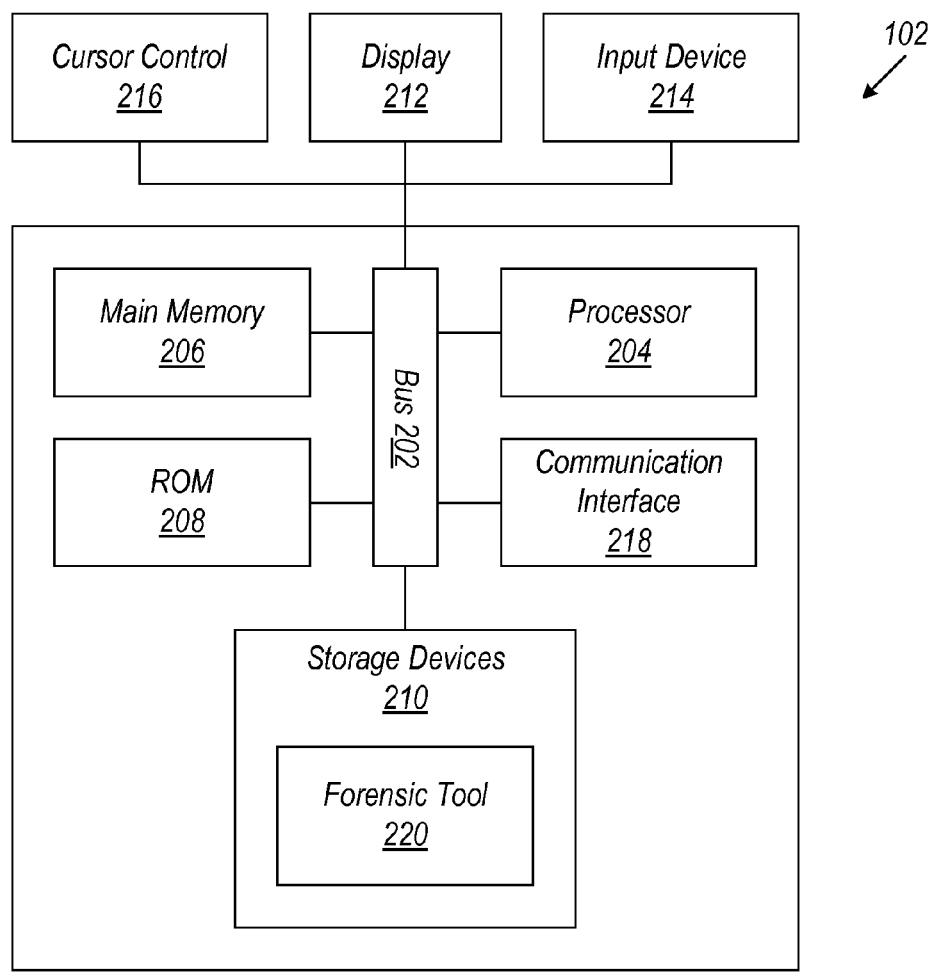
FIG. 2 illustrates an exemplary system capable of executing a digital forensic investigation tool according to the disclosed embodiments.

FIG. 2 illustrates the forensic system 102 in more detail according to the disclosed embodiments. Any suitable computer known to those having ordinary skill in the art may be used as the forensic system 102, including a personal computer, workstation, server, mainframe, and the like. Such a forensic system 102 typically includes a bus 202 or other communication mechanism for communicating information and a processor 204 coupled with the bus 202 for processing information. In some embodiments, the processor may be a single-purpose processor for encryption/decryption and acceleration, such as an ASIC or RISC processor. The forensic system 102 may also include a main memory 206, such as a random access memory (RAM) or other dynamic storage device, coupled to the bus 202 for storing computer-readable instructions to be executed by the processor 204. The main memory 206 may also be used for storing temporary variables or other intermediate information during execution of the instructions to be executed by the processor 204. The forensic system 102 may further include a read-only memory (ROM) 208 or other static storage device coupled to the bus 202 for storing static information and instructions for the processor 204. A computer-readable storage device 210, such as a magnetic, optical, or solid state device, may be coupled to the bus 202 for storing information and instructions for the processor 204.

The forensic system 102 may be coupled via the bus 202 to a display 212, such as a cathode ray tube (CRT) or liquid crystal display (LCD), for displaying information to a user. An input device 214, including, for example, alphanumeric and other keys, may be coupled to the bus 202 for communicating information and command selections to the processor 204. Another type of user input device may be a cursor control 216, such as a mouse, a trackball, or cursor direction keys for communicating direction information and command selections to the processor 204, and for controlling cursor movement on the display 212. The cursor control 216 typically has two degrees of freedom in two axes, a first axis (e.g., X axis) and a second axis (e.g., Y axis), that allow the device to specify positions in a plane. Newer generation computers with n-degrees of freedom that are capable of being used as encryption/decryption instruments for Quantum encryption are also contemplated by the disclosed embodiments.

The term "computer-readable instructions" as used above refers to any instructions that may be performed by the processor 204 and/or other components. Similarly, the term "computer-readable medium" refers to any storage medium that may be used to store the computer-readable instructions. Such a medium may take many forms, including, but not limited to, non volatile media, volatile media, and transmission media. Non volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer-readable media may be involved in carrying one or more sequences of one or more instructions to the processor 204 for execution. For example, the instructions may initially be borne on a magnetic disk of a remote computer. The remote computer can load the instructions into its dynamic memory and send the instructions over a telephone line using a modem. A modem local to the forensic system 102 can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received by the main memory 206 may optionally be stored on the storage device 210 either before or after execution by the processor 204.

The forensic system 102 may also include a communication interface 218 coupled to the bus 202. The communication interface 218 typically provides a two way data communication coupling between the forensic system 102 and the network 106. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. Regardless of the specific implementation, the main function of the communication interface 218 is to send and receive electrical, electromagnetic, optical, or other signals that carry digital, analog, spread spectrum, or quantum signaling data streams representing various types of information.

In accordance with the disclosed embodiments, a forensic tool 220, or more accurately, the computer-readable instructions therefor, may reside on the storage device 210. The forensic tool 220 may then be executed by the forensic system 102 to perform searching and examining of encrypted content recovered from various storage media. Such a forensic tool 220 according to the disclosed embodiments combines standard, well-known digital forensic techniques with automatic decryption capability for a wide range of encryption algorithms. Such an arrangement allows law enforcement agencies as well as corporate security personnel to quickly recover and decrypt content from a storage medium.

Figure 3:
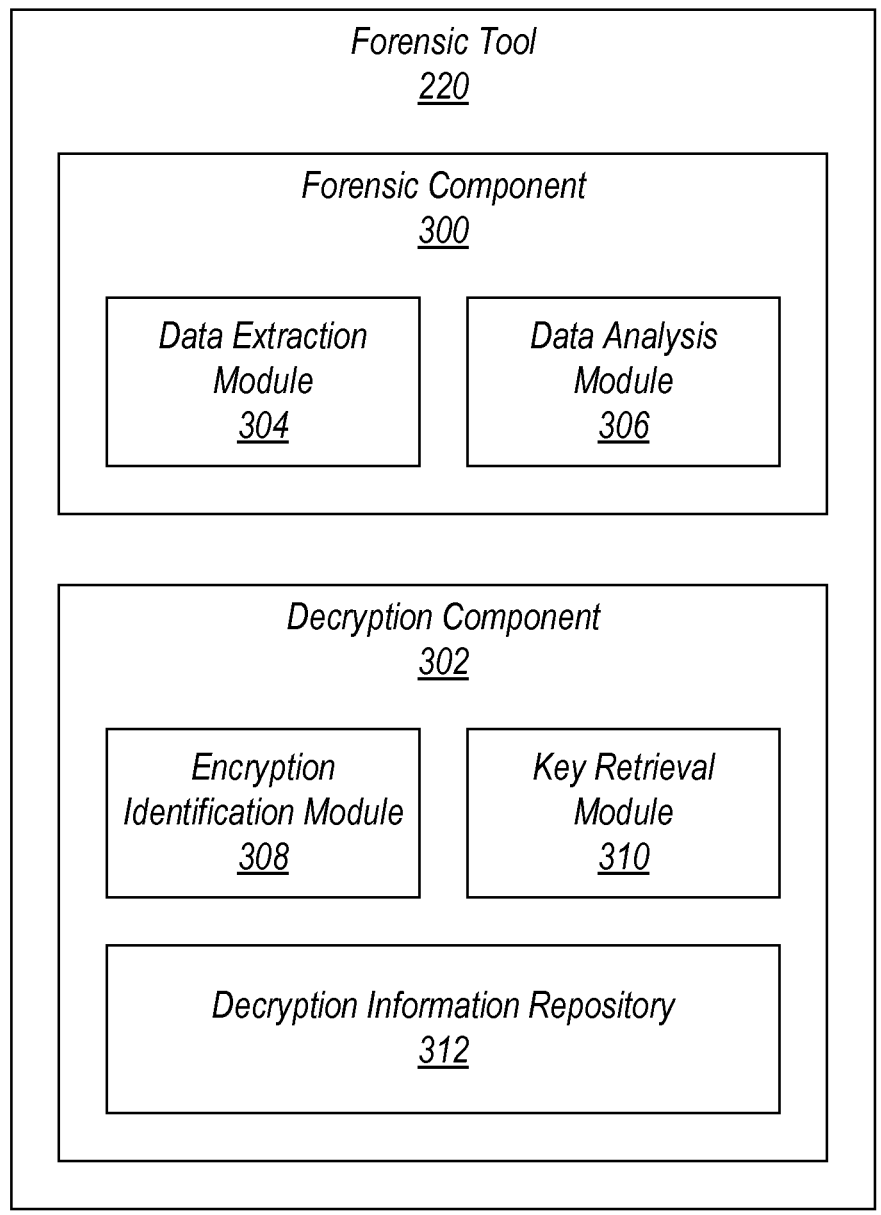
FIG. 3 illustrates an exemplary digital forensic investigation tool according to the disclosed embodiments.

FIG. 3 illustrates the forensic tool 220 in more detail according to the disclosed embodiments. In one implementation, the forensic tool 220 may comprise a number of functional components, including a forensic component 300 and a decryption component 302. The forensic component 300 may operate to recover the content stored on a storage medium and to analyze and search the content for information, whereas the decryption component 302 may operate to automatically decrypt such content as needed for analysis. Although not expressly shown, other functional components may also be present in the forensic tool 220, such as a presentation component for presenting the decrypted, analyzed and searched content, without departing from the scope of the disclosed embodiments.

Operation of the forensic component 300 of the forensic tool 220 is generally well understood by those having ordinary skill in the art and will thus be mentioned only briefly here. In general, the forensic component 300 may be composed of two main modules, a data extraction module 304 and a data analysis module 306. The data extraction module 304 functions to extract the data stored on the storage medium by reading the raw bits (i.e., 1's and 0's) on the storage medium. The data analysis module 306, on the other hand, functions to analyze and assign meaning to the bits so that they may be searched for information. This involves the data analysis module 306 organizing or grouping the bits into logical patterns from which information may be derived. To perform this function, the data analysis module 306 must typically be provided with certain items of information about the storage medium, such as media type, file system, data structure, and the like. It should be noted, however, that even with this information, a proper analysis may not be possible if a portion of the content has been overwritten with other content or is otherwise not available on the storage medium.

A proper analysis may also not be possible, or at least not practical, where the content or a portion thereof is encrypted. When the data analysis module 306 detects the content has been encrypted, it may cause the forensic tool 220 to call or otherwise invoke the decryption component 302 in order to automatically decrypt the content. In one implementation, the function of the decryption component 302 may be distributed amongst three main components: an encryption identification module 308, a key retrieval module 310, and a decryption information repository 312. Of course, those having ordinary skill in the art will understand that one or more modules may be added to or removed from the forensic tool 220 as needed without departing from the scope of the disclosed embodiments. For example, the decryption component 302 may automatically engage additional components, such as specialized decryption accelerators, as needed to open any encryption "wrapper."

The encryption identification module 308 functions to identify the type of encryption algorithm used and/or the vendor that provided the encryption. In one implementation, the encryption identification module 308 may perform this function by reading the information from the encrypted content itself. Many encryption algorithms include information in the header that identifies the encryption algorithm and/or the vendor of the encryption algorithm. An example is illustrated below for a file that has been encrypted with PGP from PGP Corp. of Palo Alto, Calif.

BEGIN PGP MESSAGE
Version: PGP 8.0.2
qANQR1DBwU4DXm0hvGRP5X8QB/93KHWvvxGwZhX0bsiYhYCY
H1KlYCdNEuaIr4U+swNNIAfvB08d25JvhoFdPQ15Gcp8Rgm4WHSM
VXiwECQyg7rZBGLGcFIpNOtHErTv98aU9A6i7V77g5IRTOvlD+Kz2
YAoLK57jSaudF51gmE8MJPBrnj4HB7Y5WOJCHGHAxyaSnFseWtZi
myidpvSY3q48TzJz5OHaQyjNn3hnxi58HHL6C9m8H6n0ilG8G11dVK
eQgw8/Ty2t0a8kAWM0Bt3OryeabM1MNh5RzcNQ/VpbjnF7Z+1gj7fB
m0eOLY69oEBD0gYaNU4dyJ/L7QGDBvelpfmXzyTMzkCvtsa+Tod5c
S0B/9NOQ4ZtuG/G7kS1yWCWdy0wqQonmAQTIN+ogfngP1B9VIOM -continued TKRAz3pgm8zyDX1iZIBtv15FW2rtTvfjdXkN7I88k6s20J1IdJydPk68vz
hAZ/kj6+n6Z8oJM2wixyxqwQuipTuqY3D79r8ooflQuArSZKhqKr8W5
MjSpBgoYS2W16Zx+tkPSyLgeNQrSmZ2//079HvNiFD/5pRc4SdYK2s
L/YMz/Va8ecrJwYlMWXB7hOAG2pm9MPeB8/P67B19ha3pSCkpiAh
j4+dBYVg/XgGO9SPHziaRn4uP6xnS3moXpVzbyMzPhYCf9qILNaUU
UoowKcU0JvAd1d1ZXQdyFdAycD6BNCsJRhXzbd3FCdVF5ePzz8Po
oehr+HYGUH+c82dfvr/2UprRWMKa9aojj/d2Jq/FinSNCXB3Yzd6vb1V
voRXPpPfbr5Eke+D5hXloNfGP65SzyQqLAZhAQ/j1MZXUs6e2yIC4j
epvgA4IqdcGIc5dkByP19fq9atOodZpowzZGJkeGX+U8TIHcdlL1Lzjl
N9IVvEuvTLrQPIPEETGTs82F38dVSIj8G7DoJbpHfVPi+OWChHFH
LB5788mXfPwmgS6G0Q66QMgxZzDr+JGVDFv7exSNA60vn0F8/gC
fM/R+AQ7f9eQbEmg0WGmYBCSSBDNrEDQFmQIUdSKoi1+Qc14te
nFs+1UtTJcdXc4TwUnHDljN6I4SQJxElg5fDW0OgfIv4/+88J0hlrNYh
1o8aUHjAVMPa+69bXPwIuHB6eFnH1lmkXQgiAWuholqqESHJciWS
oTpnUBuKLm1/ANaeZX/7YAIe7tH9sBwzRbeLmoLzKiAD+VgfjcNjfj6
4J6WO/yeP4S4P0IcOQXljm8dBaxCgPzTm63gKgOoDzK8ssHRaDOom
oh9e6w228HPxGbrf2MgloDqyAtf9lWA===O4It
-----END PGP MESSAGE-----

Example 1

As can be seen in Example 1, the header of the encrypted file indicates that the file has been encrypted with PGP, and that the particular version of PGP used is version 8.0.2. Sometimes, rather than expressly identifying the encryption algorithm, the header may instead include certain things that are known to be characteristic of the encryption algorithm, such as an extra data field in the case of AES. It is also possible to identify certain encryption algorithms based on the file format produced by the encryption algorithm, such as ".eee" for Triple Encryption files, ".efc" for Faircopy files, and the like. Once the encryption identification module 308 has identified the encryption algorithm or has otherwise been provided with the identification of the encryption algorithm, it may pass this identification information to the key retrieval module 310.

The key retrieval module 310 functions to automatically retrieve any keys that may be needed to decrypt the encrypted content. For key based encryptions, the algorithms may generally be divided into two categories: symmetric key algorithms (or private-key cryptography) and asymmetric key algorithms (or public-key cryptography). In a symmetric key algorithm (e.g., DES and AES), the sender and receiver must have a shared key set up in advance and kept secret. The sender then uses this key for encryption, and the receiver uses the same key for decryption. In an asymmetric key algorithm (e.g., RSA), there are two separate keys: a public key that is published and enables any sender to perform encryption, and a private key that is kept secret by the receiver and enables only that person to perform correct decryption.

In accordance with the disclosed embodiments, a special arrangement may be made with a third-party encryption vendor 110 to create a master shared key or a master private key, depending on the particular encryption algorithm provided by the vendor 110. Individual users may still generate their own keys for routine, day-to-day usage, but the master shared key or master private key may supersede these individual keys. Alternatively, instead of using the vendor 110, it is also possible to custom develop an encryption algorithm internally and to create a master shared key or a master private key for the custom-developed encryption algorithm. In either case, access to the master shared key or master private key may be limited only to highly authorized personnel, such as company executives and the like. Numerous techniques for implementing such restricted access, including multi-person and/or multi-level authentication, are available to those having ordinary skill in the art and will not be discussed herein.

The key retrieval module 310 may then retrieve the master shared key or a master private key from a predefined location, such as a Web site of the vendor 110, the designated key server 112 mentioned earlier, or some other predetermined location. In the case of the key server 112, such a server may be an internal key server 112 accessible only by corporate personnel, or it may be a key server 112 specifically set up by the vendor 110 for their customers to retrieve master shared keys and master private keys. In some cases, particularly where the encryption algorithm is customized or specially developed, the key retrieval module 310 may also retrieve the encryption algorithm itself (i.e., the source code or script file for the encryption algorithm).

To guard against inadvertent disclosure of the master shared key or master private key, in some implementations, the key retrieval module 310 may be configured only to cache the master shared key or master private key in temporary memory (e.g., RAM), and to prevent any attempts to store the master shared key or master private key in permanent memory. This may be accomplished, for example, by turning off the paste function of the operating system while the forensic tool 220 is in operation. Other techniques known to those having ordinary skill in the art for preventing storage of information resident in memory may also be used without departing from the scope of the disclosed embodiments. In this way, no copy of the master shared key or master private key is retained once the forensic tool 220 has been exited.

In some cases, it may not be possible or even desirable to create a master key that can supersede all other keys. For such cases, the decryption information may instead be obtained on an individual basis for users who employ encryption within the company. Such information may be accumulated over time as the users generate or otherwise receive their encryption keys from the company or the vendor 110, then stored in the decryption information repository 312. Thereafter, when the content on a particular user's storage medium needs to be investigated, the decryption information repository 312 may be accessed and the user's decryption information retrieved and used to decrypt the content. In some embodiments, the access may be accomplished automatically using the key retrieval module 310 described above.

Table 1 below illustrates an example of the decryption information that may be stored in the decryption information repository 312 for each individual user. As can be seen, the decryption information may include the name of the user, user ID, password, encryption key, security question, security answer (not shown), and the like. Note that the encryption key may be stored in the form of a binary or text file, in which case the information in Table 1 may be the name and location of the file, or it may be stored as a numeric or alphanumeric string. In some embodiments, the date and time of the last update may be included in Table 1. In addition, depending on the particular encryption algorithm used, the name of the encryption algorithm, or the name and location of the file containing the encryption algorithm, may also be stored in Table 1.

TABLE 1

| Name | User ID | Password | Encryption Key | Security Question |
|---|---|---|---|---|
| John Doe | JDoe | ******** | Jdoe010107.asc | What is the name . . . |
| Jane Smith | JSmith | ******** | Jsmith021407.asc | In which city . . . |
| . . . | . . . | . . . | . . . | . . . |

Referring still to FIG. 3, in some implementations, the decryption information repository 312 may be located locally to the forensic tool 220 and the forensic system 102 (as shown here). This allows the forensic tool 220 to immediately access the decryption information whenever needed. In other implementations, the decryption information repository 312 may be located in a remote location, such as on the key server 112 or the Web site of the vendor 110. The key to module 310 of the forensic tool 220 may then be used to automatically retrieve each user's decryption information as needed. In either case, a graphical user interface may be provided for allowing users to interact with the decryption information repository 312 to thereby register or receive their encryption key.

Figure 4:
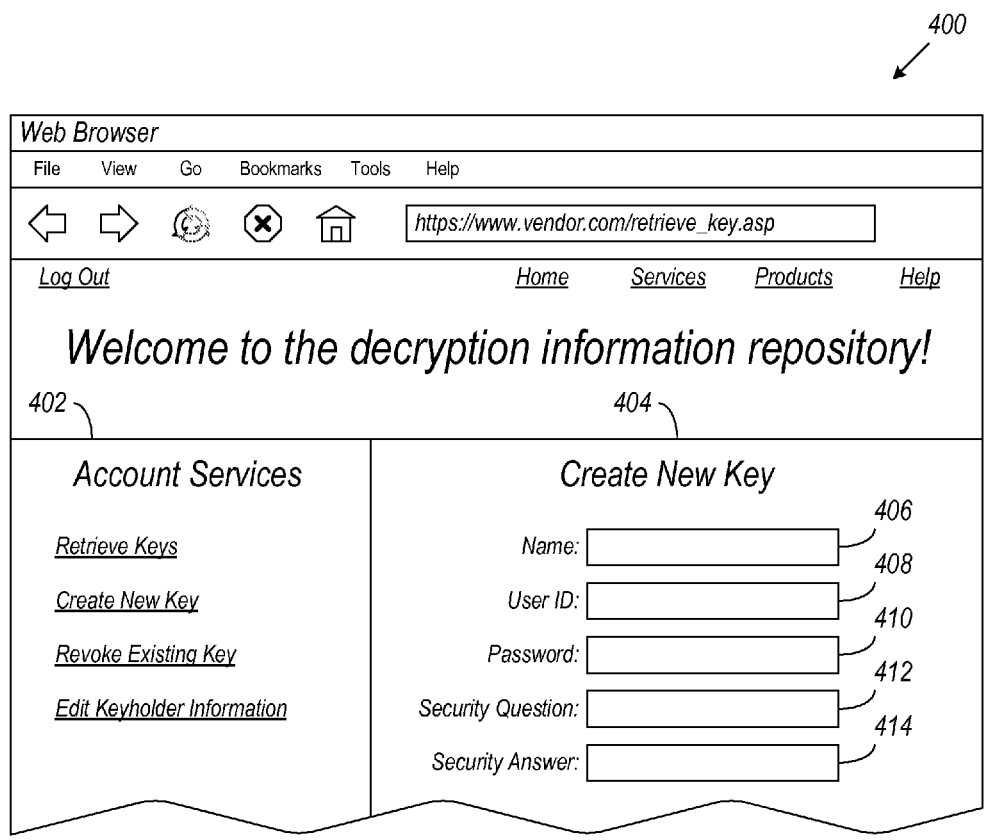
FIG. 4 illustrates an exemplary Web page for authenticating a digital forensic investigation tool according to the disclosed embodiments.
Figure 5:
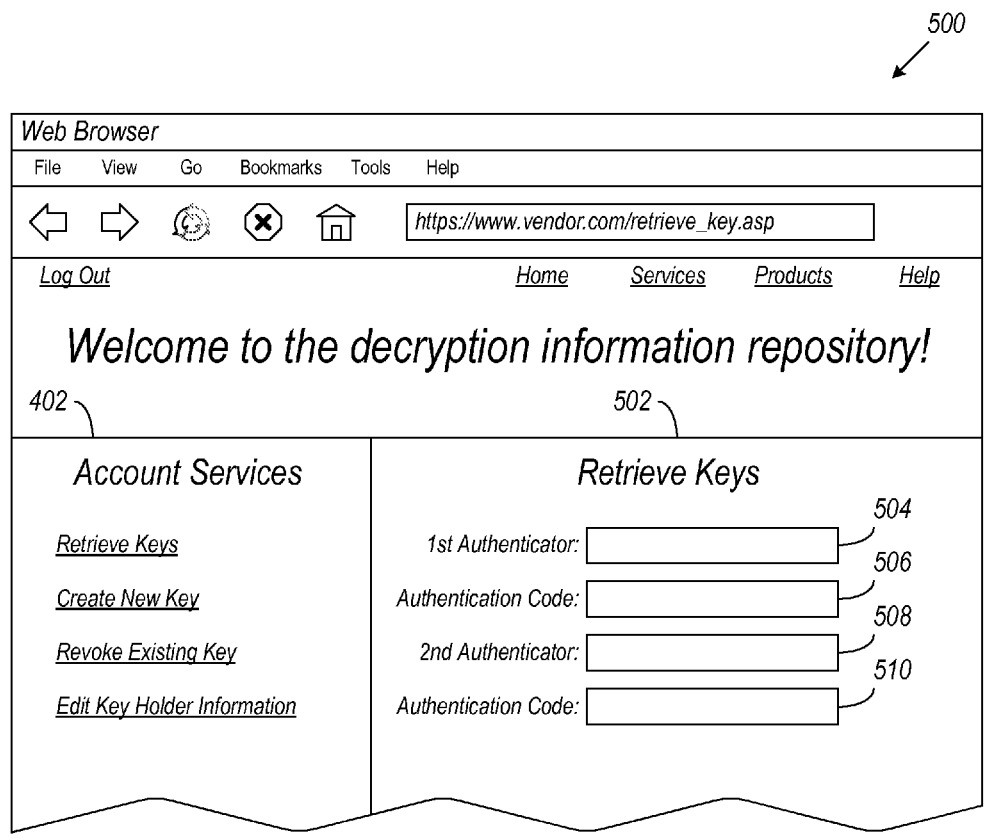
FIG. 5 illustrates an exemplary Web page for providing decryption information to digital forensic investigation tool according to the disclosed embodiments.

An example of a graphical user interface for allowing users to interact with the decryption information repository 312 is illustrated in FIGS. 4-5. The exemplary graphical user interface of FIGS. 4-5 is in the form of a Web page, but those having ordinary skill in the art will certainly understand that other presentation formats may certainly be used. In addition, the exemplary graphical user interface reflects an arrangement in which a company maintains control of the decryption information repository 312 and generates the encryption keys. However, it will be readily evident that the graphical user interface may also reflect an arrangement in which a vendor maintains control of the decryption information repository 312 and generates the encryption keys.

Referring first to FIG. 4, an exemplary Web page 400 is shown for managing decryption information according to the disclosed embodiments. Such a Web page 400 may be displayed after a user has logged in, or has otherwise authenticated himself/herself, to the Web site. As can be seen, the Web page 400 comprises an account services area 402 the account services that are available to the user. These account services may include, for example, a "Retrieve Keys" service in which authorized personnel may retrieve individual user keys, master shared keys, and/or master private keys. The account services may also include a "Create New Key" service that allows the user to request his/her own encryption key. Other account services that may be provided include a "Revoke Key" service for revoking existing keys, and "Edit Keyholder Information" service for allowing a keyholder to modify his/her information, and the like.

Selecting the "Create New Key" service brings up a Create New Key area 404 in which the user may request a new encryption key be generated. In the example shown, the Create New Key area 404 may include a plurality of fields for the user to enter his/her information. These fields may include, for example, a name field 406, a user ID field 408, and a password field 410 for allowing the user to fill in this information. In some implementations, the Create New Key area 404 may also include a security question field 412 and security answer field 414, or other methods known by those with ordinary skill in the art to utilize multi-factor identification (e.g., as outlined in White House Memorandum M-04-04), for allowing the user to enter a security question and answer, respectively.

For arrangement where the users generate the encryption keys on their own, a Web page similar to the Web page 400 in FIG. 4 may be provided, except that the "Create New Key" service may be replaced, for example, by a "Register New Key" service. In that case, the Create New Key area 404 may be replaced by a Register New Key area, with modifications to the various data fields made accordingly.

FIG. 5 illustrates an exemplary Web page 500 in which the user has selected the "Retrieve Keys" service from the account services area 402. Selecting this service brings up a Retrieve Keys area 502 for allowing authorized personnel to retrieve one or more encryption keys, including individual user keys, master shared keys, and/or master private keys.

Owing to the inherently sensitive nature of the keys, the Retrieve Keys area 502 may require a higher level of authentication than usual. For example, the Retrieve Keys area 502 may require multi-person authentication where two or more people must present authentication information before any keys are released, and/or multi-factor identification (e.g., as outlined in White House Memorandum M-04-04). Thus, the Retrieve Keys area 502 may include a first authenticator field 504 and an authentication code field 506 corresponding to that first authenticator, and a second authenticator field 508 along with an authentication code field 510 corresponding to that second authenticator. Only when all four items of information have been authenticated may any keys be released.

Figure 6:
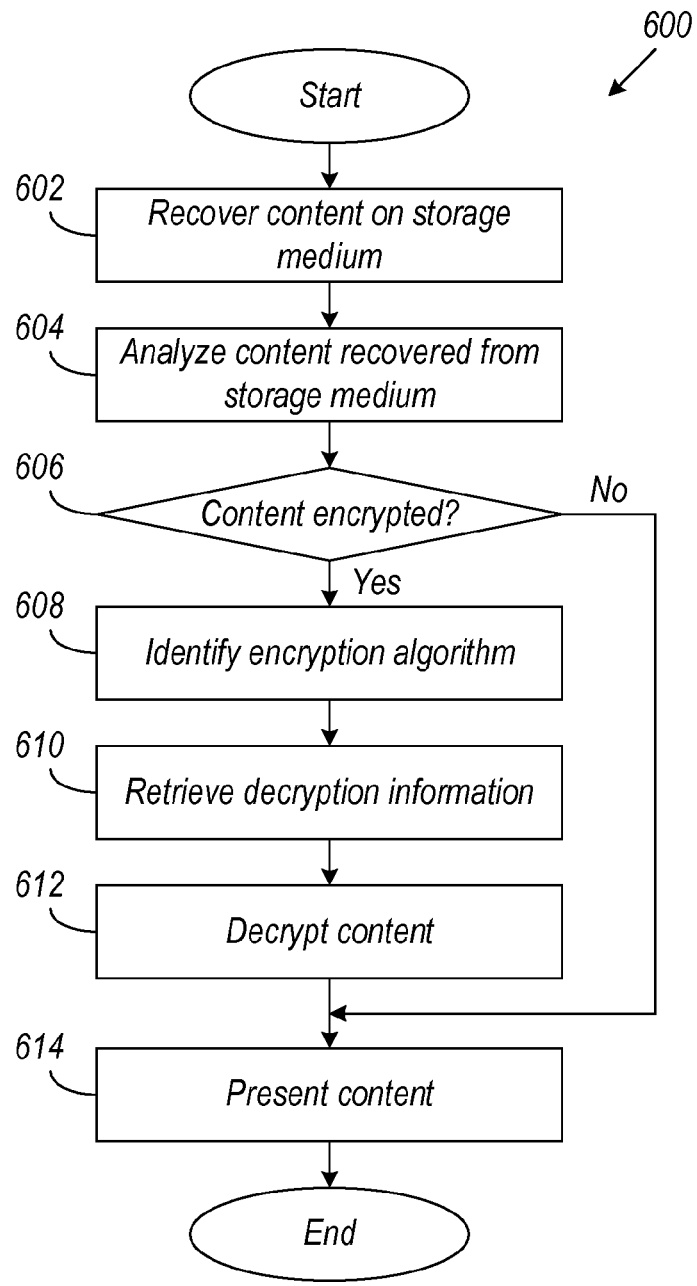
FIG. 6 illustrates an exemplary method of lamenting a digital forensic investigation tool according to the disclosed embodiments.

Thus far, specific embodiments have been disclosed for a digital forensic investigation tool capable of recovering and decrypting encrypted content. Referring now to FIG. 6, general guidelines are shown in the form of a method 600 that may be used to implement the various embodiments disclosed above. The method 600 begins at block 602, where a forensic tool may be used to recover content on a storage medium. The forensic tool may also be used to analyze the content recovered from the storage medium at block 604. A determination may then be made at block 606 as to whether the content is encrypted. If the answer is no, then the content is simply presented to a user at block 614, and the method is ended.

On the other hand, if the content is encrypted, then at block 608, the forensic tool attempts to identify the type and/or vendor of the encryption algorithm used to encrypt the content. If the forensic tool cannot identify the encryption algorithm, then this information may be either manually provided or obtained some other way. Once the encryption algorithm has been identified, the forensic tool automatically retrieves any decryption information needed to decrypt the content at block 610. It is of course possible for the forensic tool to retrieve the decryption information manually or through some type of assisted method. At block 612, the forensic tool uses the decryption information to decrypt the content. The decrypted content is thereafter presented to the user at block 614.

While the disclosed embodiments have been described with reference to one or more particular implementations, those skilled in the art will recognize that many changes may be made thereto. For example, other encryption algorithms besides the ones disclosed herein may also be used, such as quantum encryption algorithms based on quantum key distribution techniques. Therefore, each of the foregoing embodiments and obvious variations thereof is contemplated as falling within the spirit and scope of the disclosed embodiments, which are set forth in the following claims.

What is claimed is:

1. A non-transitory computer-readable medium encoded with computer-readable instructions for conducting a digital investigation, the computer-readable instructions comprising instructions stored thereon that are executed by a processor for causing a computer to:
   extract data content from a storage medium;
   search the extracted data content on the storage medium and determine whether the extracted data content is encrypted;
   decrypt the encrypted extracted data content, wherein decrypting the encrypted extracted data content includes retrieving decryption information, stored in a cache memory only; and
   disable a paste function of an operating system of the computer to prevent storage of the decryption information in a permanent memory.

2. The computer-readable medium of claim 1, further comprising instructions for causing the computer to search the decrypted extracted data content for evidence that may be used in a criminal or civil proceeding.

3. The computer-readable medium of claim 1, wherein the data content is one of: data, text, images, video, and audio.

4. The computer-readable medium of claim 1, wherein the storage medium is one of: a hard drive, a network storage area, a USB keychain drive, a CD, a DVD, and a solid state drive, a memory card.

5. The computer-readable medium of claim 1, wherein the storage medium is one of: completely encrypted, and partially encrypted.

6. The computer-readable medium of claim 1, wherein the data content is encrypted using one of: an encryption algorithm, a compression algorithm, and a copy protection algorithm.

7. A non-transitory computer-readable medium encoded with computer-readable instructions for decrypting content recovered during a digital investigation, the computer-readable constructions comprising instructions stored thereon that are executed by a processor for causing a computer to:
   search for content that has been encrypted on a storage medium;
   recover bits from the searched for content on the storage medium, the bits representing content that has been encrypted on the storage medium;
   identify an encryption algorithm used to encrypt the content recovered from the storage medium;
   retrieve decryption information for decrypting the content recovered from the storage medium, wherein the decryption information is stored in a cache memory only;
   disable a paste function of an operating system of the computer to prevent storage of the decryption information in a permanent memory; and
   automatically decrypt the content recovered from the storage medium using the decryption information.

8. The computer-readable medium of claim 7, wherein the decryption information is one of: a master key of the encryption algorithm, and an individual user key of the encryption algorithm.

9. The computer-readable medium of claim 7, wherein the encryption algorithm is one of: a symmetric key encryption algorithm, and an asymmetric key encryption algorithm.

10. The computer-readable medium of claim 7, wherein the encryption algorithm is one of: a custom-develop encryption algorithm, an industry-accepted encryption algorithm.

11. The computer-readable medium of claim 7, wherein the encryption algorithm is identified from one of: header information of the encrypted content, a predefined characteristic of the encrypted content, and a file format of the encrypted content.

12. The computer-readable medium of claim 7, wherein the decryption information includes one of: a source code for the encryption algorithm, and a script file for the encryption algorithm.

13. A non-transitory computer-readable medium encoded with computer-readable instructions for providing decryption information for a digital investigation tool, the computer-readable instructions comprising instructions stored thereon that are executed by a processor for causing a computer to:
   search for content that has been encrypted on a storage medium using a data analysis component;
   call a decryption component when encrypted content is found through the search, wherein the decryption component accesses a decryption information repository;

allow users to store decryption information in the decryption information repository;

disable a paste function of an operating system of the computer to prevent users from storing decryption information in a permanent memory;

confirm that a user of the digital investigation tool is authorized to access the decryption of information stored in the repository; and transfer selected decryption information stored in the repository to the digital investigation tool.

14. The computer-readable medium of claim 13, wherein the decryption information includes a decryption key, further comprising instructions for causing a computer to require the user to access the repository in order to receive the decryption key.

15. The computer-readable medium of claim 13, wherein the decryption information includes a decryption key, further comprising at instructions for causing a computer to allow the user to generate the decryption key and to register the decryption key with the repository.

16. The computer-readable medium of claim 13, wherein the repository is one of: an internal company repository, a public key server, and an encryption vendor Web site.

17. The computer-readable medium of claim 13, wherein control of the repository is maintained by one of: a company, and a third-party vendor on behalf of the company.

18. The computer-readable medium of claim 13, wherein the decryption information includes one of: a user name, a user ID, a user password, an encryption algorithm, and a key for the encryption algorithm.

19. The computer-readable medium of claim 13, wherein confirming includes one of: a multi-person authentication, and a multi-level authentication.

* * * * *